(12) United States Patent
Van De Putten et al.

(10) Patent No.: US 7,059,668 B2
(45) Date of Patent: Jun. 13, 2006

(54) WIND DEFLECTOR AND OPEN ROOF CONSTRUCTION PROVIDED THEREWITH

(75) Inventors: Erik Van De Putten, Helmond (NL); Bernd Wilms, Brüggen (DE)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 11/012,899

(22) Filed: Dec. 15, 2004

(65) Prior Publication Data

US 2005/0151397 A1   Jul. 14, 2005

(30) Foreign Application Priority Data

Dec. 18, 2003   (EP)   .................................. 03104789

(51) Int. Cl.
*B60J 7/22*   (2006.01)
(52) U.S. Cl. ..................................................... 296/217
(58) Field of Classification Search ................. 296/217
See application file for complete search history.

(56) References Cited

U.S. PATENT DOCUMENTS

| 3,311,406 | A | * | 3/1967 | Fritsch ......................... 296/217 |
| 4,395,939 | A | | 8/1983 | Hough et al. |
| 5,671,970 | A | | 9/1997 | Edelmann |
| 6,045,176 | A | | 4/2000 | Shoup |
| 6,086,146 | A | * | 7/2000 | Nabuurs ....................... 296/217 |
| 6,227,613 | B1 | * | 5/2001 | Maciejewski et al. ....... 296/217 |
| 6,474,730 | B1 | * | 11/2002 | Konermann ................. 296/217 |

FOREIGN PATENT DOCUMENTS

| DE | 1008592 | | 5/1957 | |
| DE | 3512312 | | 10/1985 | |
| DE | 4033027 | A1 | 4/1992 | |
| DE | 4034851 | * | 5/1992 | ................. 296/217 |
| DE | 4104446 | * | 8/1992 | ................. 296/217 |
| DE | 4402314 | A | 8/1995 | |
| EP | 0586245 | | 3/1994 | |
| EP | 1008477 | | 6/2000 | |
| GB | 2003-801 | | 3/1979 | |
| JP | 59057014 | | 4/1984 | |
| JP | 403248917 | | 11/1991 | |

OTHER PUBLICATIONS

European Search Report of the European Patent Office in counterpart foreign application No. 03104789.7 filed Dec. 18, 2003.

* cited by examiner

*Primary Examiner*—Dennis H. Pedder
(74) *Attorney, Agent, or Firm*—Steven M. Koehler; Westman, Champlin & Kelly, P.A.

(57) ABSTRACT

A wind deflector is presented for use at the leading end of a roof opening in a roof of a vehicle, which wind deflector at least comprises a transversally extending longitudinal main body with a forward side extending upwardly and rearwardly. The main body over at least part of its transverse length is provided with an opening in its lower section, which opening defines the access to a chamber of which a substantially upwardly directed wall is constructed in such a manner that an air stream entering said chamber through the access opening in the main body of the wind deflector is slowed down in said chamber and leaves said chamber through said upwardly directed wall only in a limited amount and with reduced velocity compared to the initial air stream velocity.

11 Claims, 1 Drawing Sheet

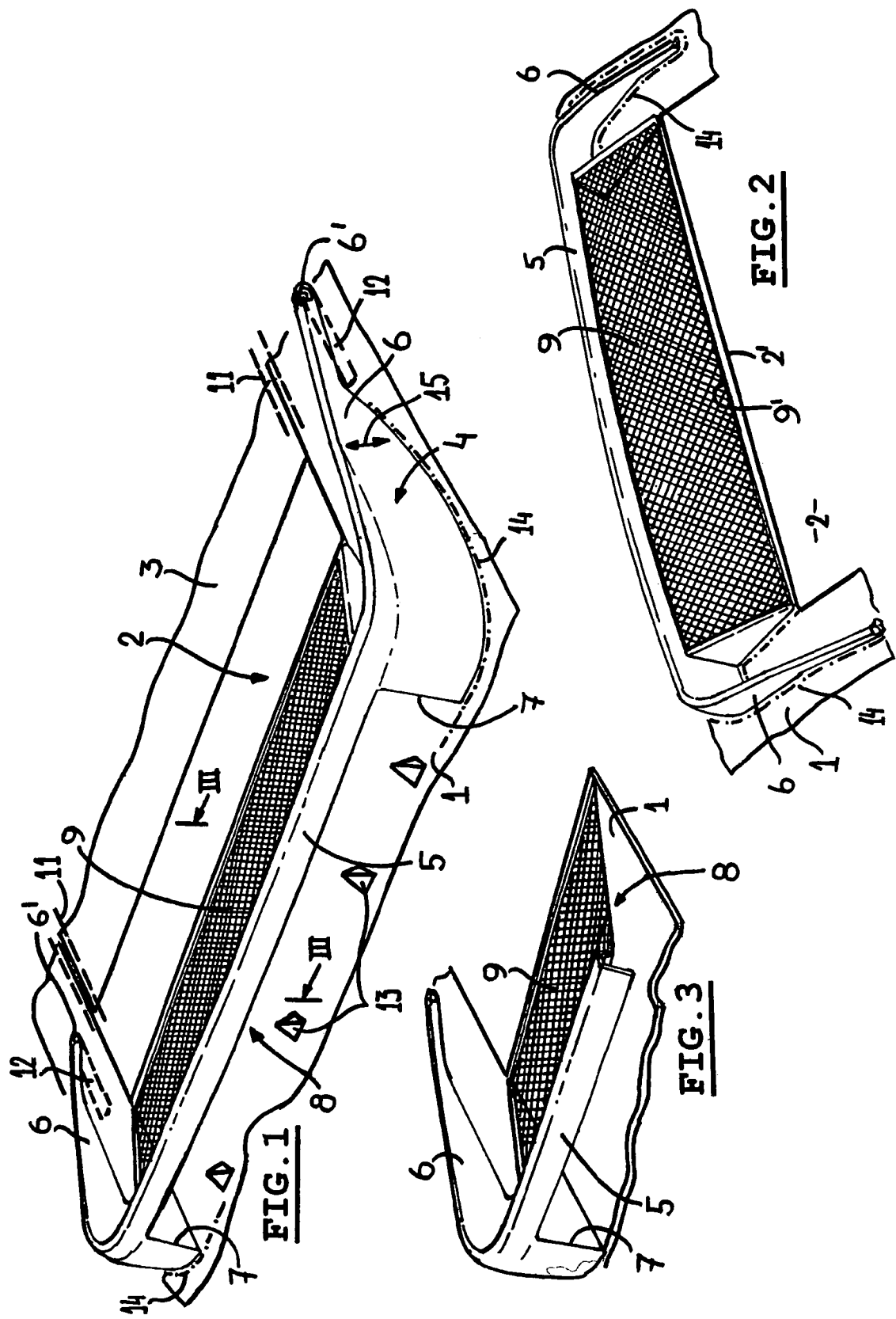

WIND DEFLECTOR AND OPEN ROOF CONSTRUCTION PROVIDED THEREWITH

BACKGROUND OF THE INVENTION

The invention relates to a wind deflector for use at the leading end of a roof opening in a roof of a vehicle, which wind deflector at least comprises a transversally extending longitudinal main body with a forward side extending upwardly and rearwardly.

When the vehicle is moving with its roof opening in an open position, the wind deflector deflects the air stream at least partially away from the roof opening. Thus the wind deflector contributes to the reduction of disturbing noises generated by air passing over and entering the roof opening. Such disturbing noises often are indicated as "boom" and "buffeting".

SUMMARY OF THE INVENTION

It is an object of the present invention to provide an improved wind deflector.

Thus, as an aspect of the present invention, there is provided a wind deflector adapted for use at the leading end of a roof opening in a roof of a vehicle, which wind deflector at least comprises a transversally extending longitudinal main body with a forward side extending upwardly and rearwardly, wherein the main body over at least part of its transverse length is provided with an opening in its lower section, which opening defines the access to a chamber of which a substantially upwardly directed or inclined wall is constructed in such a manner that an air stream entering said chamber through the access opening in the main body of the wind deflector is slowed down in said chamber and leaves said chamber through said upwardly directed wall only in a limited amount and with reduced average velocity and/or increased turbulence compared to the initial air stream.

As a method, in the chamber an air buffer or air cushion is created which will act as a flow body generating a controlled air stream over the wind deflector, i.e. the main body thereof. A small part of the air stream however will leave the chamber through said upwardly directed wall with a reduced average velocity and/or increased turbulence and generated vortices. Said vortices will better isolate the main stream over the main body of the wind deflector from the interior of the vehicle, thus in an improved manner eliminating or reducing undesirable "boom" or other noises. During preliminary tests a substantial reduction of noise was measured. As a result, the interior of the vehicle will be sufficiently silent, when the roof opening is in its open position and the vehicle is moving fast.

Preferably, said substantially upwardly directed wall is constructed to allow airflow therethrough such as being constructed from an air-permeable mesh material. Such an air-permeable mesh material may be a textile material. However, also other materials may be applied, such as a perforated metal or plastic sheet.

Further, the substantially upwardly directed wall can have a downward inclination in a rearward direction. This may offer advantages with regard to the generated air flow as well as constructional advantages.

In still a further embodiment, a bottom wall of the chamber is defined by at least in part of the roof of the vehicle. This reduces the number of parts of the wind deflector in some embodiments of the present invention.

Preferably, the access opening extends over the larger part of the transverse length of said main body. As a result, the effectivity of the wind deflector is optimised by extending across the roof opening.

It is noted, that the access opening can be one single opening, or a series of smaller openings positioned one aside another. Further it is possible, that in the access opening air stream regulating means are provided such as but not limited to vortex generators, which can contribute to a further optimisation of the effect of the wind deflector.

In its most simple embodiment, the wind deflector is stationary. However, as is known per se, the wind deflector also may be of the type that is movable between a retracted position substantially within the boundaries of the roof and an extended position projecting above said roof. In such an embodiment, however, the access opening only will be present when the wind deflector is in its extended position. In its retracted position the access opening lies below the outer surface of the roof, and the chamber will not be accessible.

The invention further relates to an open roof construction or assembly for a vehicle having a roof opening defined in a roof of the vehicle. The assembly includes a movable closure means (well known rigid panels, folding roofs, etc.) for opening and closing the roof opening, wherein in front of said roof opening a wind deflector according to the present invention is positioned.

Preferably, in such an open roof construction, the rear edge of said substantially upwardly directed wall of the chamber substantially coincides with a forward edge of the roof opening in said roof. Thus, the wind deflector is positioned as close to the roof opening as possible, as a result of which the advantageous air stream effects created thereby are brought as close as possible to the roof opening.

Finally, in such an open roof construction-preferably the transverse length of the access opening corresponds substantially with the transverse width of the roof opening.

BRIEF DESCRIPTION OF THE DRAWINGS

Hereinafter the invention will be elucidated referring to the drawing, in which an embodiment of the wind deflector and open roof construction in accordance with the present invention are illustrated.

FIG. 1 shows schematically and perspectively a first view, substantially from the front, of an embodiment of a wind deflector in combination with an open roof construction;

FIG. 2 shows the assembly of FIG. 1 in a second view, substantially from the rear, and FIG. 3 shows a section according to III—III in FIG. 1 in a perspective view.

DETAILED DESCRIPTION OF THE ILLUSTRATIVE EMBODIMENT

Firstly referring to FIG. 1, part of a roof 1 of a vehicle is represented. In said roof 1 a roof opening 2 is defined which can be opened and closed by a movable closure means 3. The closure means 3 can be of any type, such as a moving panel or a foldable cloth operable with suitable guides and drive mechanisms schematically indicated at 11 that are well known in the art and comprise part of an open roof construction or assembly.

In front of the roof opening 2 a wind deflector 4 is positioned, which can also be part of the open roof construction or assembly. This wind deflector 4 comprises a transversally extending longitudinal main body 5 with a forward (frontal) side extending upwardly and typically, (slightly) rearwardly. The wind deflector 4 further comprises two legs 6 (side walls) which basically extend in parallel to the longitudinal direction of the vehicle. Over part of its transverse length (in the illustrated embodiment over the larger part of the transverse length) said main body 5 is provided with an opening 7. Said opening defines the access to a chamber 8 for capturing a portion of an airstream.

Said chamber 8 is defined by a substantially inclined or upwardly directed wall 9 which is constructed in such a manner that an air stream entering said chamber 8 through the access opening 7 in the main body 5 of the wind deflector 4 is slowed down in said chamber 8 and leaves said chamber through said upwardly directed wall 9 only in a limited amount and with reduced velocity and/or increased turbulence compared to the average initial air stream, i.e, proximate air stream ahead of the opening 7 or over the main body 5. In the illustrated embodiment, the upwardly directed wall 9 is constructed of an air-permeable mesh material, although other constructions that are air-permeable to allow airflow therethrough such as a plate with apertures can also be used.

The figures clearly show that, in the present embodiment, the wall 9 has a downward inclination in a rearward direction (i.e. towards the roof opening 2). Further, as is most clearly illustrated by FIG. 3, the wind deflector 4 is adapted such that a bottom wall of the chamber 8 can be defined by at least part of the roof 1 of the vehicle to minimise parts, although a bottom wall can also be provided as part of the wind deflector, if desired.

In the illustrated embodiment the transverse length of the access opening 7 corresponds substantially with the transverse width of the roof opening 2 (as is most clearly illustrated in FIG. 1).

In the access opening 7 air stream regulator for regulating air may be provided such as but not limited to vortex generators 13.

Especially referring to FIG. 2, it is clearly shown that in the illustrated embodiment the rear edge 9' of the upwardly directed wall 9 of the chamber 8 can substantially coincide with a forward edge 2' of the roof opening 2 in said roof 1 at least in its operable position to deflect air.

The illustrated wind deflector 4 may be of the type that is movable between the a retracted position substantially within the boundaries of the roof 1 and an extended, operable position projecting above said roof 1 (as illustrated in the figures). Thus, as illustrated schematically, the legs 6 of the wind deflector 4 may be provided with hinges 6' (represented herein by apertures) or other mechanisms cooperating (in a manner not shown in detail but known per se) with corresponding parts of the roof 1 since, then, typically the wind deflector 4 will move up and down between the retracted and extended positions as indicated schematically by arrow 15 in FIG. 1. In addition or in the alternative, the wind deflector 4 can also move linearly or across the fixed roof 1 driven by suitable mechanisms schematically illustrated at 12 between the retracted and extended positions. Such mechanisms can be similar to components 11 used for closure 3 and can also be connected thereto to coordinate movements of the wind deflector 4 with movement of the closure 3. In these embodiments, a properly dimensioned opening or recess in the roof 1 can be provided for receiving the wind deflector 4 in its retracted position. FIGS. 1 and 2 illustrate with dashed line 14 an outline for such a recess to accommodate portions (e.g. walls 6 and sidewalls supporting wall 9 in the inclined position) of the wind deflector that would extend into the recess. As appreciated by those skilled in the art, the recess would be configured to accommodate such portions during any intermediate positions of the wind deflector based on movement (pivoting and/or linear movements) of the wind deflector between the retracted and extended positions. When the wind deflector 4 is in its retracted position within the roof 1, the access opening 7 will not be available to receive air. Thus, in such a case the chamber 8 will be inaccessible. Preferably, however such a retracted position will only be assumed when the vehicle is not moving or when the roof opening 2 is closed by the closure means 3.

The combination of main body 5 and wall 9 will create an air stream pattern with a main flow over the main body 5 and a secondary flow through the wall 9 generating vortices. Said vortices will isolate the interior of the vehicle effectively from the main flow, thus very effectively eliminating the entrance of disturbing noises into the roof opening of the vehicle.

The invention is not limited to the embodiment described before, which may be varied widely within the scope of the appending claims.

What is claimed is:

1. A wind deflector adapted for use at the leading end of a roof opening in a roof of a vehicle, which wind deflector at least comprises a transversally extending longitudinal main body with a forward side extending upwardly, wherein the main body over at least part of its transverse length is provided with an access opening in its lower section, which access opening defines the access to a chamber of which a substantially upwardly directed wall is constructed in such a manner that an air stream entering said chamber through the access opening in the main body of the wind deflector is slowed down in said chamber and leaves said chamber through said upwardly directed wall only in a limited amount and with reduced average velocity and/or increased turbulence compared to the initial air stream, the access opening having a lowermost end adjacent to a bottom wall defining the chamber.

2. The wind deflector according to claim 1, wherein said substantially upwardly directed wall is air-permeable.

3. The wind deflector according to claim 1, wherein the substantially upwardly directed wall has a downward inclination in a rearward direction.

4. The wind deflector according to claim 1, and further comprising sidewalls adapted to engage part of the roof of the vehicle that provides the bottom wall for the chamber.

5. The wind deflector according to claim 1, wherein the access opening extends over the larger part of the transverse length of said main body.

6. The wind deflector according to claim 1, wherein in the access opening an air stream regulator is provided.

7. The wind deflector according to claim 1, and further comprising a mechanism adapted to move the wind. deflector between a retracted position substantially within the boundaries of the roof and an extended position projecting above said roof.

8. An open roof construction assembly for a vehicle having a roof opening defined in a roof of the vehicle, the assembly comprising:

a closure adapted to open and close the roof opening; and
a wind deflector positioned in front of said roof opening for forward movement of the car, the wind deflector comprising a transversally extending longitudinal main body with a forward side extending upwardly, wherein the main body over at least part of its transverse length is provided with an access opening in its lower section, which access opening defines the access to a chamber of which a substantially upwardly directed wall is constructed in such a manner that an air stream entering said chamber through the access opening in the main body of the wind deflector is slowed down in said chamber and leaves said chamber through said upwardly directed wall only in a limited amount and with reduced average velocity and/or increased turbulence compared to the initial air stream, the access opening having a lowermost end adjacent to a bottom wall defining the chamber.

9. The open roof construction assembly according to claim 8, wherein a rear edge of said substantially upwardly directed wall of the chamber substantially coincides with a forward edge of the roof opening in said roof.

10. The open roof construction assembly according to claim 8, wherein a transverse length of the access opening corresponds substantially with the transverse width of the roof opening.

11. A method for deflecting air over a roof opening of a vehicle as the vehicle moves, the method comprising:

capturing air in such a manner that a portion of an initial air stream approaching the roof opening is slowed down and directed upwardly in front of the roof opening in a limited amount and with reduced average velocity and/or increased turbulence compared to the initial air stream, wherein capturing comprises disposing a main body in front of the roof opening for forward motion of the vehicle, the main body having an access opening defining the access to a chamber having an upwardly directed wall through which the portion of air is directed upwardly, the access opening having a lowermost end adjacent to a bottom wall defining the chamber, allowing capturing of air along the bottom wall across the access opening.

* * * * *